Figure 1:
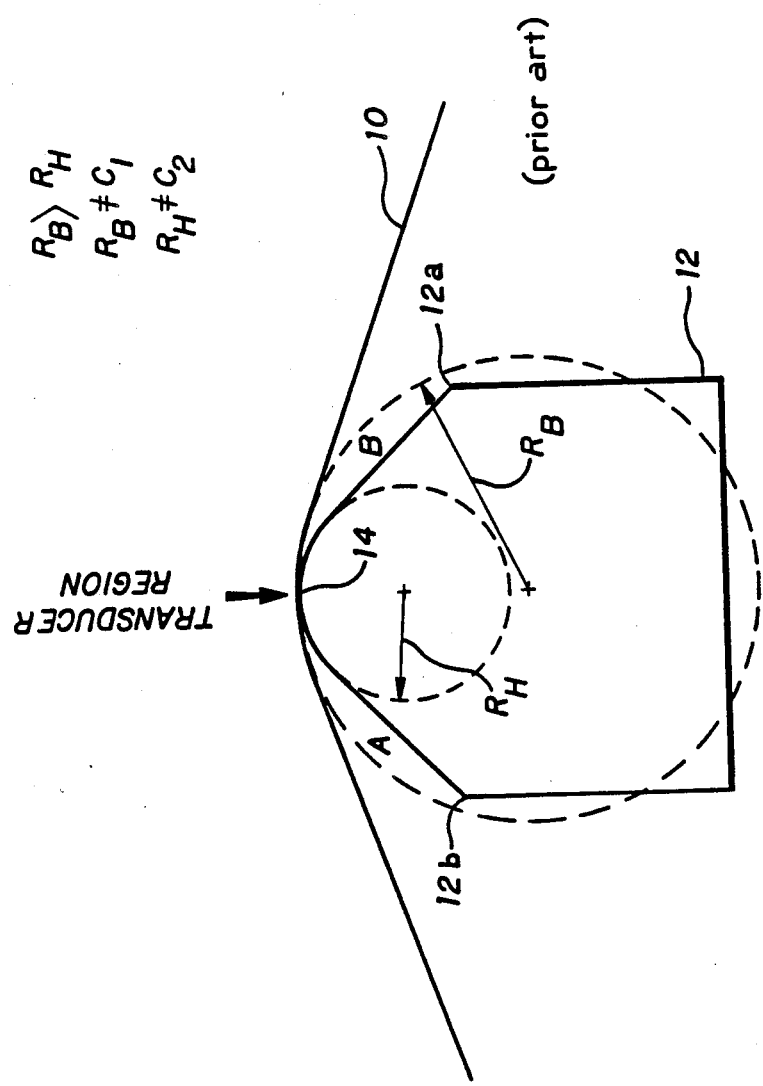

United States Patent [19]

McClure

[11] Patent Number: 4,853,814
[45] Date of Patent: Aug. 1, 1989

[54] MAGNETIC HEAD WITH CONSTANT AREA WEAR PROFILE

[75] Inventor: Richard J. McClure, San Diego, Calif.

[73] Assignee: Eastman Kodak Company, Rochester, N.Y.

[21] Appl. No.: 288,927

[22] Filed: Dec. 23, 1988

Related U.S. Application Data

[62] Division of Ser. No. 138,756, Dec. 28, 1987, abandoned.

[51] Int. Cl.$^4$ .............................................. G11B 5/22
[52] U.S. Cl. .................................................... 360/122
[58] Field of Search ............................... 360/122, 125

[56] References Cited

U.S. PATENT DOCUMENTS

| | | | |
|---|---|---|---|
| 3,737,582 | 6/1973 | De Moss | 360/122 |
| 3,947,887 | 3/1976 | Platter | 360/103 |
| 4,669,016 | 5/1987 | Schmid et al. | 360/122 |

FOREIGN PATENT DOCUMENTS

| | | | |
|---|---|---|---|
| 57-200922 | 12/1982 | Japan | 360/122 |
| 59-16119 | 1/1984 | Japan | 360/122 |
| 59-213013 | 12/1984 | Japan | 360/122 |
| 61-5408 | 1/1986 | Japan | 360/122 |
| 61-80607 | 4/1986 | Japan | 360/122 |

OTHER PUBLICATIONS

IBM/TDB, vol. 19, No. 5, Oct. 1976, p. 1885, "Stabilized Wasp-Waist Head", by Nelson et al.
IEEE Transactions on Magnetics, vol. MAG-17, No. 6, Nov. 1981, "A Simple Tape Wrap Around a Guide", by Clurman.

Primary Examiner—John H. Wolff
Attorney, Agent, or Firm—Daniel Robbins

[57] ABSTRACT

A particularized cross section for a magnetic recording head provides a constant area wear profile for cooperating magnetic tape. The constant area wear profile results from the "combined" use of a common radius of curvature for both the natural bending radius of the tape as well as the tape-contacting surface of the head, taken together with the requirement that the leading and trailing medium-contacting parts of the head form air-skiving edges which are essentially parallel to the force- (or pressure-) direction associated with the tape-contacting interface.

1 Claim, 3 Drawing Sheets

MAGNETIC HEAD WITH CONSTANT AREA WEAR PROFILE

This is a division of application Ser. No. 138,756, filed Dec. 28, 1987, now abandoned.

BACKGROUND OF THE INVENTION

1. Field of the Invention

This invention relates in general to magnetic recording, and in particular to an improved design for a magnetic head especially useful with a magnetic tape system.

2. Description Relative to the Prior Art

A major concern in any recording system is that of the head-to-medium interface. Ideally, the head should make intimate contact with the recording medium to minimize the spacing loss as defined by the following expression:

$$SL = 55 \, d/\lambda$$

where
- SL is the spacing loss in decibels,
- $\lambda$ is the recorded wavelength, and
- d is the head-to-medium spacing distance.

Various efforts have been employed, not only to minimize head-to-medium spacing, but also to provide easy and smooth passage of the medium over the face of the head, as well as to minimize head wear. For any of a number of reasons, prior art attempts at providing such head qualities are wanting: For example, in connection with a tape medium system, no known prior art head simultaneously a. works to eliminate the space formed by an air bearing between the head and the tape, which undesirably serves to increase the aforesaid spacing loss, and b. works to present a virtually invariant head structure—despite wear, and irrespective of the direction of tape movement relative to the head—to the tape transmitted thereacross, whereby the performance of system electronics, and tape tensioning and servos therefor, may be virtually standardized and/or uniformly operated for the full life of the head.

Prior art patents which may be considered in relation to the invention are: U.S. Pat. No. 3,947,887 entitled "Transducer Head Contour And Method of Generating Same", and U.S. Pat. No. 4,669,016 entitled, "Thin Layered Magnetic Head".

SUMMARY OF THE INVENTION

At the heart of the invention is a head cross section that provides a constant area wear profile to the medium which travels thereacross. The constant area wear profile results from the "combined" use of a common radius of curvature for both the natural bending radius of the medium as well as the medium-contacting surface of the head, taken together with the requirement that the leading and trailing medium-contacting parts of the head form air-skiving edges which are essentially parallel to the force- (or pressure-) direction associated with the medium-contacting interface. Because of the commonality of the radii of curvature, the medium-to-head pressure applied to the head face is entirely uniform thereacross; and because of the force- (or pressure-) direction parallelism of the head edges, not only is spacing-loss-producing air precluded from between the head and medium, but also the uniformity of the medium-to-head pressure, as a function of head wear, is essentially preserved. Thus, during the wear-life of the head, the interaction between the head and medium is both excellent, and essentially continuously the same, whereby system parameters involving electronics, tape tensioning servos, and the like may be simplified.

Figure 2:
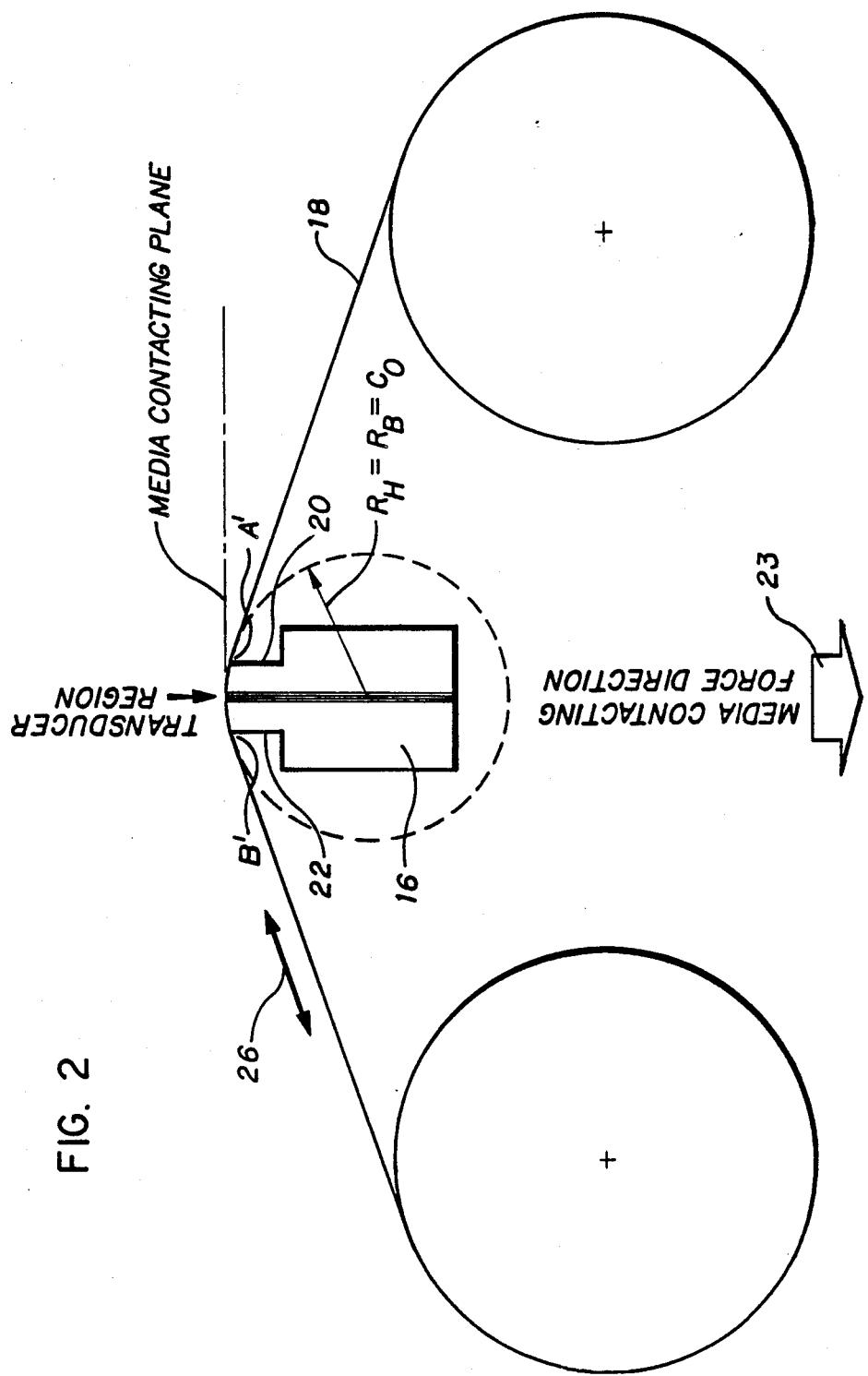
Figure 3:
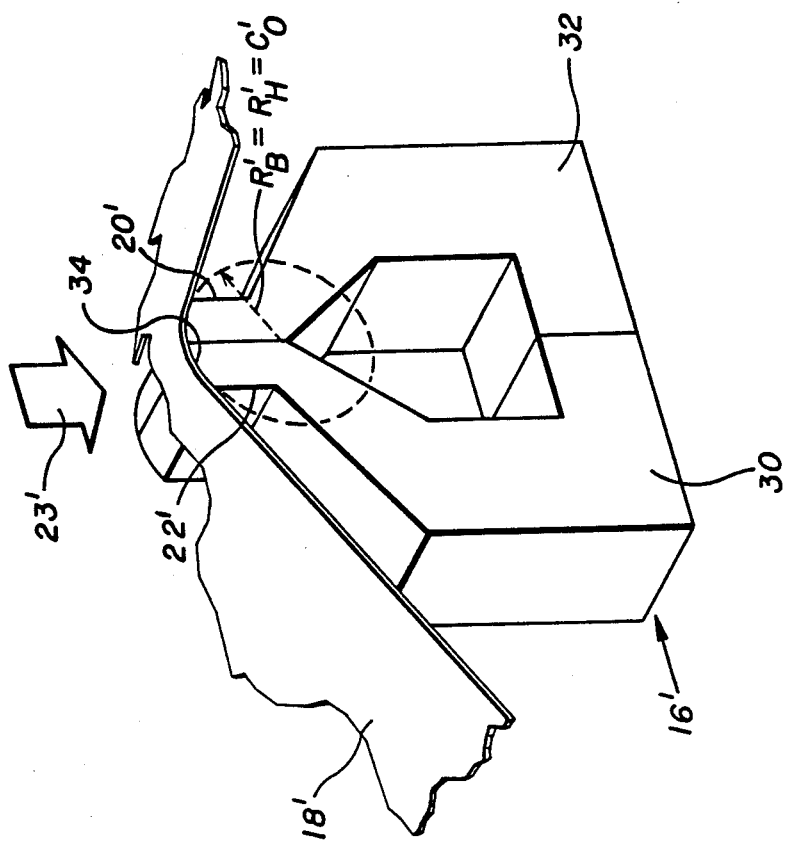

The invention, as well as the prior art, will now be described with reference to the figures, of which FIG. 1 is a schematic diagram illustrating the cross-section of a typical prior art magnetic head, FIG. 2 is a schematic diagram illustrating a magnetic tape recording system utilizing a magnetic head pursuant to the invention, and FIG. 3 is a perspective view showing a magnetic head according to another embodiment of the invention.

Referring to the prior art showing of FIG. 1, a magnetic tape 10 is indicated in cooperation with a prior art magnetic head 12. The head 12 has a representative prior art cross-section and, at the tape-contacting surface 14, has a radius of curvature $R_H$. Conventionally, such a cross-section is achieved by rounding the head surface to an acceptable degree, as noted by inspection. The tape 10 has, as indicated, a natural bending radius of curvature $R_B$ that is significantly greater than $R_H$. (Wiuth $R_B$ greater than $R_H$, undue pressure can exist at the head-to-tape interface; with, however, $R_H$ being greater than $R_B$, the leading and trailing edges 12a, 12b of the head 12 can be forced to carry too much of the load of the tape 10, thereby relieving what would otherwise be appropriate heat-to-tape pressure at the "transducer region" of the head.)

The following will be appreciated from an examination of FIG. 1:

a. as the head 12 wears, $R_H$ will increase ($R_H \neq C_2$, i.e., $R_H$ does not have a constant value $C_2$), thereby tending to change the head-to-tape pressure in the head "transducer region", b. air will be entrained, regardless of the tape direction in the region A, B between the head 12 and tape 10, thereby altering the spacing-loss factor, c. as the head wears, $R_B$ will change ($R_B \neq C_1$, i.e., the tape, being forced into contact with a changing $R_H$, does not maintain a constant value $C_1$ for the natural bending radius $R_B$), thereby increasing the amount of head surface with which the tape is in contact.

d. a, b, c above, singly and together, will cause tape tension, servo, electronic, and other, concerns.

To obviate all of the above described problems associated with prior art heads, the invention, as indicated in FIG. 2, provides that the radius of curvature ($R_H$) of the head 16 (in this case, a thin-film head) be matched to the natural bending radius ($R_B$) of the medium 18; and that the medium-contacting surface of the head have leading and trailing edges 20, 22 which are essentially parallel to the direction of the medium-contacting pressure or force 23. As will be appreciated, the aforesaid combination provides:

a. uniform pressure across the medium-contacting face of the head b. a cross-section which is such that it provides the head with a constant wear area so that, despite such head wear, the uniform-pressure of (a) above remains essentially constant ($R_H = R_B = C_O$) for the life of the head 16, and c. skiving of air from entrainment at the shoulder-formed points A', B' to preserve intimate head-to-medium contact, whereby irrespective of the direction of medium-travel 26, system electronics, tape tensioning, etc., may be optimized...and will essentially remain so as though in an invariant system.

The invention has been described in detail with particular reference to a presently preferred embodiment, but it will be understood that variations and modifications can be effected within the spirit and scope of the invention. For example, while the invention is cast in the environment of a thin-film head 16, it can, as indicated in FIG. 3, be employed in, say, a head 16' comprised of first and second half cores 30, 32 of ferrite material... the point being that, in such a head 16', the medium-contacting surface 34 of the head has, pursuant to the invention, a radius of curvature $R'_H$ equal to the natural bending radius $R'_B$ of the tape 18', and that the medium-contacting half-core edges 20', 22' are parallel to the force-direction 23', thereby to preserve a constant wear area and good medium-to-head interface despite head wear.

What is claimed is:

1. A magnetic head for use in recording signal information on or reproducing signal information from a magnetic tape medium, said head having a constant radius of curvature (RH) along the entire head-to-medium interface, the tape medium having a natural bending radius of curvature ($R_B$), the head and tape radii of curvature being substantially identical with $R_H = R_B$, so that, during recording or reproducing signal information, said natural bending radius of said tape medium substantially and uniformly contacts said head radius of curvature and applies a uniform pressure across the full areal dimension of said mutually contacting surfaces, said head further having leading and trailing medium-contacting edges which are orthogonal to the direction of tape travel and which extend into leading and trailing surfaces which are parallel to each other and normal to the direction of tape travel, thereby to lessen the entrainment of air between said medium and said head while simultaneously preserving the aforesaid uniform contact between said head and said medium so as to insure a uniform wear profile across said head-to-medium interface.

* * * * *